(12) United States Patent
Amano

(10) Patent No.: US 12,386,458 B2
(45) Date of Patent: Aug. 12, 2025

(54) OPERATION DETECTION DEVICE, OPERATION DETECTION UNIT, AND OPERATION DETECTION METHOD

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/423,803

(22) Filed: Jan. 26, 2024

(65) Prior Publication Data

US 2024/0281092 A1     Aug. 22, 2024

(30) Foreign Application Priority Data

Feb. 20, 2023   (JP) ................. 2023-024475

(51) Int. Cl.
  *G06F 3/0362*   (2013.01)
  *G06F 3/041*    (2006.01)
  *G06F 3/044*    (2006.01)

(52) U.S. Cl.
  CPC .......... *G06F 3/0418* (2013.01); *G06F 3/0362* (2013.01); *G06F 3/044* (2013.01)

(58) Field of Classification Search
  None
  See application file for complete search history.

(56) References Cited

U.S. PATENT DOCUMENTS

| | | | |
|---|---|---|---|
| 11,972,053 B2* | 4/2024 | Orita | G06F 3/04166 |
| 2009/0009491 A1* | 1/2009 | Grivna | H03K 17/9622 |
| | | | 345/184 |
| 2015/0378504 A1* | 12/2015 | Hayasaka | G06F 3/0416 |
| | | | 345/173 |

FOREIGN PATENT DOCUMENTS

| | | |
|---|---|---|
| FR | 3 041 445 A1 | 3/2017 |
| WO | WO 2014/132893 A1 | 9/2014 |
| WO | WO 2022/090091 A1 | 5/2022 |

OTHER PUBLICATIONS

Extended European Search Report from EP 24157811.1, May 28, 2024, 11 pgs.

* cited by examiner

*Primary Examiner* — Parul H Gupta
(74) *Attorney, Agent, or Firm* — Crowell & Moring LLP

(57) ABSTRACT

A control unit of an operation detection device 1) determines, based on a detection result of a sensor panel, whether the number of peripheral proximity points (which are points at which a detected object is in contact with or in proximity to a detection surface in a peripheral region of a periphery of a knob member) is two or more, 2) determines that an operation by a user is valid when the number of peripheral proximity points is two or more and the peripheral proximity points transition to a specific mode, and 3) conversely determines that the operation by the user is not valid regardless of the transition of the peripheral proximity points when the number of peripheral proximity points is not two or more.

7 Claims, 15 Drawing Sheets

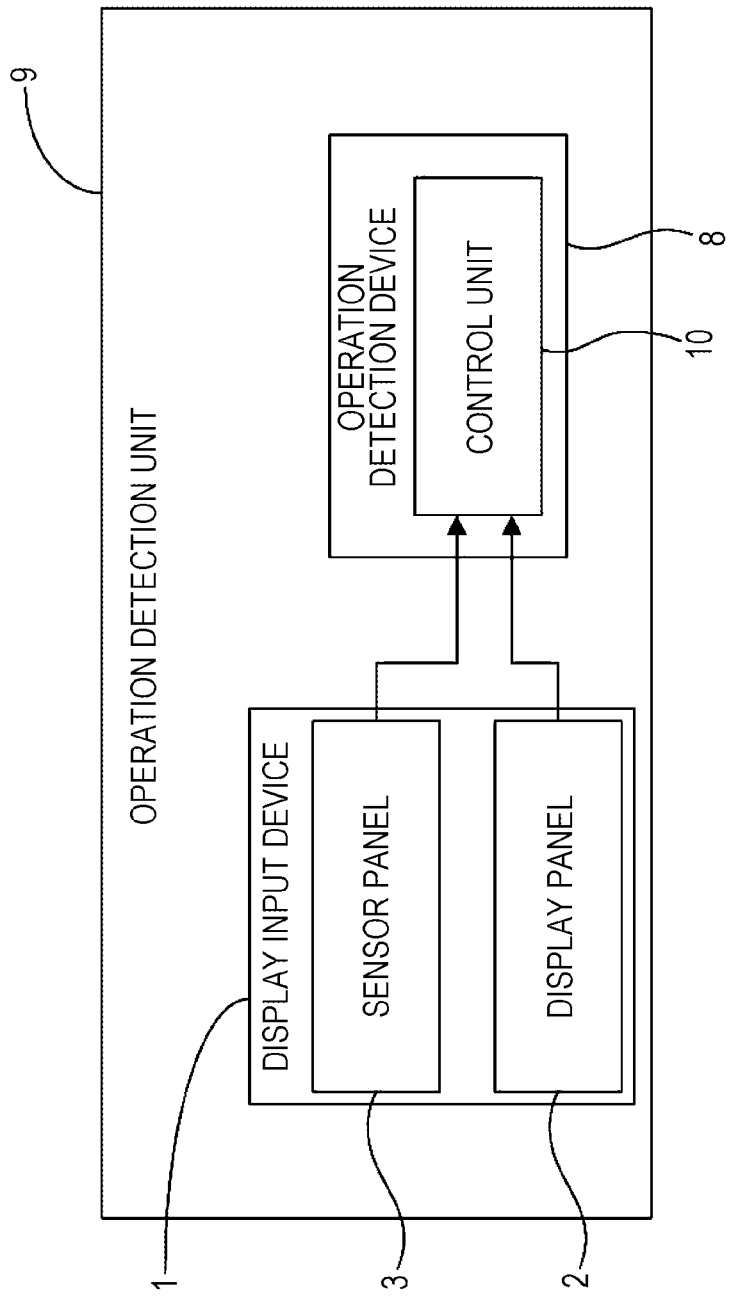

| 1 | 2 | 2  | 6  | 3  | 2  | 1 |
|---|---|----|----|----|----|---|
| 1 | 31| 45 | 65 | 55 | 30 | 0 |
| 3 | 32| 66 | 77 | 61 | 30 | 1 |
| 0 | 26| 63 | 87 | 64 | 20 | 0 |
| 2 | 41| 64 | 61 | 60 | 15 | 0 |
| 4 | 23| 19 | 22 | 14 | 8  | 1 |
| 1 | 3 | 1  | 0  | 0  | 2  | 0 |

OPERATION DETECTION DEVICE, OPERATION DETECTION UNIT, AND OPERATION DETECTION METHOD

RELATED APPLICATION

The present application claims priority to Japanese Patent Application No. 2023-024475, filed Feb. 20, 2023, the entirety of which is herein incorporated by reference.

BACKGROUND

1. Field

The present disclosure relates to an operation detection device, an operation detection unit, and an operation detection method, and is particularly suitable for use in: 1) an operation detection device that detects an operation on a knob member fixed in a non-rotatable state on a detection surface of an electrostatic capacitive sensor panel, 2) an operation detection unit including the sensor panel and the operation detection device, and 3) an operation detection method by the operation detection device.

2. Description of the Related Art

In the related art, an input device including an electrostatic capacitive sensor panel is known (see, for example, WO 2014/132893). WO 2014/132893 describes a technique for detecting a gesture (scrolling, zooming, rotating, or the like) executed using a plurality of fingers based on a detection result of a sensor panel (detection unit 3) for this type of input device. In the related art, there is known an input device including a sensor panel and a knob member fixed to a detection surface of the sensor panel in a non-rotatable state and assumed to be held by fingers of a user's hand. Hereinafter, the input device including such a knob member is referred to as an "input device with a knob" to facilitate description.

FIG. 18 is a front view illustrating an example of an input device X1 with a knob, and FIG. 19 is a cross-sectional view taken along the line A-A of FIG. 18. The input device X1 with a knob illustrated in FIGS. 18 and 19 is very simplified. As illustrated in FIGS. 18 and 19, the input device X1 with a knob includes a sensor panel X2, a cover member X3 provided on a front surface of the sensor panel X2, and a knob member X4 fixed to the cover member X3. Since the knob member X4 is fixed to the cover member X3, the knob member X4 is not rotatable.

In the input device X1 with the knob of the related art illustrated in FIGS. 18 and 19, an operation on the knob member X4 is detected by the following method. That is, as illustrated in FIG. 18, a region X5 is defined around the knob member X4. Then, an operation detection device (not illustrated) that executes a process of detecting an operation determines whether a detected object (which is assumed to be a finger) transitions to a predetermined mode in a state of which contact with or proximity to a detection surface X7 of the sensor panel X2 in the region X5 based on a detection result of the sensor panel X2, and determines that an operation of the user is valid when the detected object (which is assumed to be a finger) has transitioned. When it is determined that the operation of the user is valid, the operation detection device executes an action corresponding to the operation. As an example, when the knob member X4 is used to adjust an increase or decrease of a volume of an audio device, the operation detection device increases (or decreases) the volume by one unit and executes an action when the operation is enabled.

SUMMARY

However, detection of an operation on a knob member of the above-described input device with a knob of the related art has the following problems. That is, as illustrated in FIG. 20, when the user's finger accidentally passes by or around the knob member X4, the operation detection device may detect that the finger transitions to a predetermined mode in a state of contact with or proximity to the detection surface X7 in the region X5, and the operation may be determined to be valid, irrespective of an intention of the user to operate the knob member M4. In particular, for the knob member X4, the user is not required to apply an appropriate force to the member in an appropriate direction as in a mechanical rotary switch that is used by being rotated. There is a strong need to inhibit the operation from being determined to be valid against an intention of the user because the operation may be considered to be valid when the finger only passes by or through the region X5, as illustrated in FIG. 20.

The present disclosure has been devised to solve such problems, and an object of the present disclosure is to inhibit an operation from being determined to be valid against an intention of a user with regard to detection of the operation on a knob member fixed to a detection surface of a sensor panel.

In order to solve the above problems, the operation detection device according to an aspect of the present disclosure has the following configuration. That is, the operation detection device is a device that is fixed to a detection surface of an electrostatic capacitive sensor panel in a non-rotatable state and detects an operation on a knob member assumed to be held by a hand of a user. The operation detection device 1) determines, based on a detection result of the sensor panel, whether the number of peripheral proximity points that are points at which a detected object is in contact with or in proximity to the detection surface in a peripheral region of a periphery of the knob member is two or more, 2) determines that an operation by the user is valid when the number of peripheral proximity points is two or more and the peripheral proximity points transition to a specific mode, and 3) determines that the operation by the user is not valid regardless of the transition of the peripheral proximity points when the number of peripheral proximity points is not two or more.

When a user executes an operation using the knob member, it is assumed that the knob member is pinched. Therefore, two or more fingers are located on the periphery of the knob member. In other words, when the finger is not in such a state, there is a high possibility of an operation being unintended by the user, even if it is detected that the finger transitions to a predetermined mode around the knob member. Based on the above, according to the present disclosure configured as described above, when there are not two or more points at which a detected object is in contact with or in proximity to the detection surface on the periphery of the knob member, that is, when it is assumed that two or more fingers are not located on the periphery of the knob member and the user is not pinching the knob member, the operation by the user is not valid. Therefore, when the user executes an operation using the knob member, the characteristic that two or more fingers are located on the periphery of the knob member can be validly utilized to inhibit the operation from being determined to be valid against an intention of the user.

BRIEF DESCRIPTION OF THE DRAWINGS

FIG. 4 is a block diagram illustrating a functional configuration example of the operation detection device according to an embodiment of the present disclosure along with a configuration of an operation detection unit;

DETAILED DESCRIPTION

Figure 1:
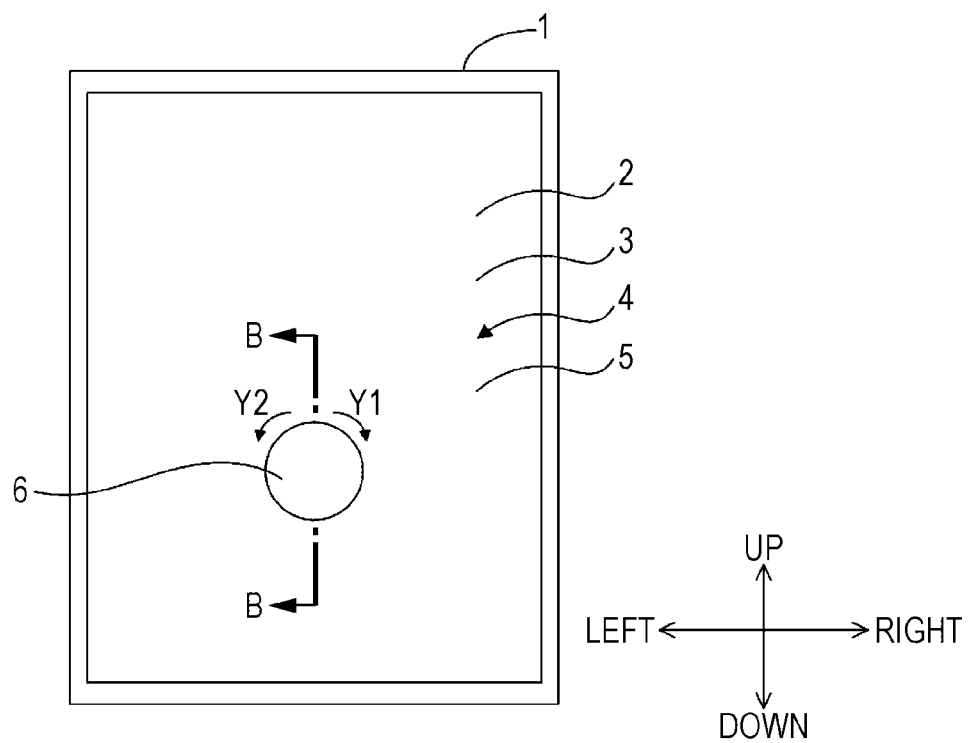
FIG. 1 is a front view illustrating a display input device according to an embodiment of the present disclosure.
Figure 2:
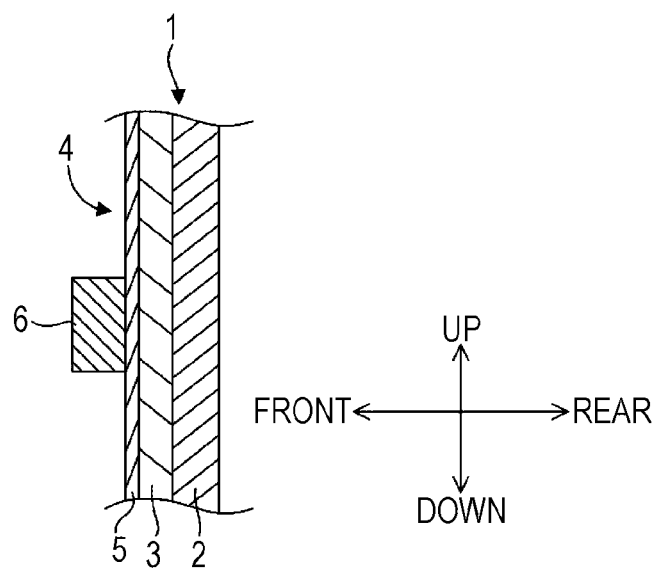
FIG. 2 is a cross-sectional view taken along the line B-B of FIG. 1.

Hereinafter, embodiments of the present disclosure will be described based on the drawings. FIG. 1 is a front view illustrating a display input device 1 (input device) according to an embodiment. FIG. 2 is a cross-sectional view taken along the line B-B of FIG. 1. The display input device 1 illustrated in FIGS. 1 and 2 is illustrated with a simplified structure of the device. Hereinafter, the front-rear direction, the left-right direction, and the up-down direction based on the display input device 1 are defined as indicated by arrows in FIGS. 1 and 2.

The display input device 1 includes a display panel 2 such as a liquid crystal display or an organic EL panel, and a sensor panel 3 disposed to overlap the display panel 2. A detection surface 4 detecting an operation by a user is formed on the sensor panel 3. The sensor panel 3 will be described in detail below. The display input device 1 has a function of displaying a video on the display panel 2 and a function of receiving an operation on the detection surface 4 from the user. The display input device 1 is provided on, for example, an instrument panel of a vehicle, a center console of the vehicle, or another predetermined location of vehicle. However, a location where the display input device 1 is provided is not limited to the illustrated location.

As illustrated in FIGS. 1 and 2, a cover member 5 made of glass or another transparent member is disposed on a front surface of the sensor panel 3. A knob member 6 is provided at a predetermined position of the cover member 5. The knob member 6 is fixed to the cover member 5 by adhesion or other unit. That is, the knob member 6 is fixed to the detection surface 4 of the sensor panel 3 with the cover member 5 interposed therebetween in a non-rotatable state. In the embodiment, the knob member 6 is separate from the cover member 5, but these members may be integrated. The knob member 6 is a columnar member protruding forward with respect to the detection surface 4. However, the shape of the knob member 6 is not limited to the shape exemplified in the embodiment. As an example, the shape of the knob member 6 may be a shape of which a diameter slightly increases (or decreases) toward the front. The knob member 6 can be made of a transparent member.

Figure 3A:
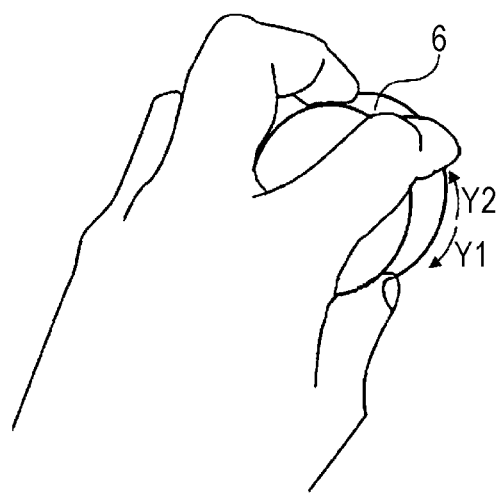
FIGS. 3A and 3B are views illustrating a usage mode of a knob member.
Figure 3B:
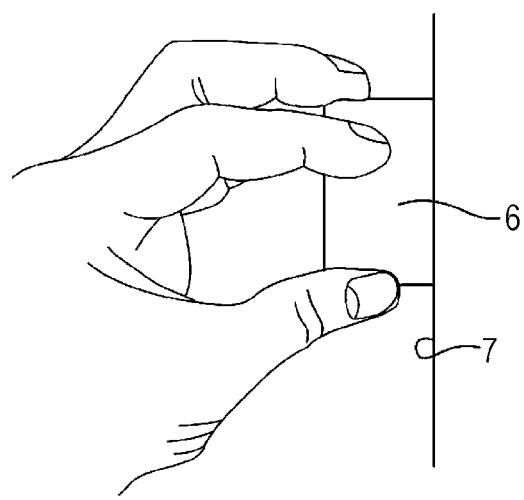

FIGS. 3A and 3B are diagrams illustrating usage modes of the knob member 6. As illustrated in FIGS. 3A and 3B, it is assumed that the knob member 6 is used by being by fingers of a user's hand. When the user pinches the knob member 6 with her or his fingers, the user usually brings two or more fingers into contact with the outer periphery of the knob member 6. As illustrated in FIG. 3B, the fingers brought into contact with the knob member 6 are often separated from the surface 7 of the display input device 1 without being brought in contact with the surface 7 (or may be brought in contact with the surface 7).

In the embodiment, as a simplified example, it is assumed that the knob member 6 can be used to adjust the volume of an audio device (not illustrated). For example, after the user pinches the knob member 6 in the mode exemplified in FIGS. 3A and 3B, the user can gradually increase the volume of the audio device by rotating the entire hand clockwise Y1 (FIGS. 1 and 3A) while sliding the finger on the outer periphery of the knob member 6. In this case, each of the fingers in contact with the outer periphery of the knob member 6 transitions the clockwise direction Y1 along the outer periphery. On the other hand, the user can gradually reduce the volume of the audio device by rotating the entire hand counterclockwise Y2 (FIGS. 1, 3A, and 3B) while sliding fingers on the outer periphery of the knob member 6 after pinching the knob member 6. In this case, each of the fingers in contact with the outer periphery of the knob member 6 transitions the counterclockwise direction Y2 along the outer periphery.

FIG. 4 is a block diagram illustrating a functional configuration example of the operation detection device 8 according to the embodiment along with a configuration of the operation detection unit 9. As illustrated in FIG. 4, the operation detection unit 9 includes a display input device 1 and an operation detection device 8. The display input device 1 includes a display panel 2 and a sensor panel 3. The operation detection device 8 includes a control unit 10 as a functional configuration. The control unit 10 can be configured with any of hardware, a digital signal processor (DSP), and software. For example, when the control unit 10 is configured with software, the control unit 10 actually includes a CPU, a RAM, and a ROM of a computer and is implemented by operating a program stored in a recording medium such as a RAM, a ROM, a hard disk, or a semiconductor memory.

The control unit 10 has a function of displaying an image on the display panel 2. In the following description, it is assumed that the video is appropriately displayed on the display panel 2 from the control unit 10. Detailed description of this function will be omitted.

The control unit 10 has an electrostatic capacitance correspondence value detection function of detecting an electrostatic capacitance correspondence value corresponding to a change in electrostatic capacitance at each of the detected points formed on the detection surface 4 of the sensor panel 3. First, the electrostatic capacitance correspondence value detection function of the control unit 10 will be described below in detail.

The sensor panel 3 is an electrostatic capacitive touch sensor, and detected points are formed in a matrix form in the entire region of the detection surface 4 of the sensor panel 3. Each of the detected points is a point at which a change in electrostatic capacitance is detected and an electrostatic capacitance correspondence value corresponding to the change in electrostatic capacitance is detected. An electrostatic capacitance correspondence value table is stored in a storage area such as a RAM of the operation detection device 8. In this electrostatic capacitance correspondence value table, coordinate information indicating coordinates (also functioning as identification information for uniquely identifying the detected point) and the electrostatic capacitance correspondence value detected by the control unit 10 are registered in association for all the detected points. The electrostatic capacitance correspondence value table is data in which a detection result of the sensor panel 3 is reflected. Accordingly, processes executed with reference to the electrostatic capacitance correspondence value table by the control unit 10 are all processes executed based on a detection result of the sensor panel 3.

The control unit 10 detects a change in electrostatic capacitance at all the detected points based on the detection result of the sensor panel 3 at a predetermined cycle and detects an electrostatic capacitance correspondence value indicating the magnitude of the change in electrostatic capacitance at all the detected points. In the embodiment, to facilitate description, it is assumed that, as the electrostatic capacitance correspondence value, a value is taken in the range of 0 to 100 points ("points" are units for convenience). When there is no change in the electrostatic capacitance, the electrostatic capacitance correspondence value is a minimum value of 0 points. When an assumed maximum change occurs, the electrostatic capacitance correspondence value is a minimum value of 100 points. After the control unit 10 detects electrostatic capacitance correspondence values at all the detected points, the control unit 10 updates the electrostatic capacitance correspondence value table based on the detected electrostatic capacitance correspondence values for the detected points. As a result, at a predetermined cycle, the values of the electrostatic capacitance correspondence values of the detected points registered in the electrostatic capacitance correspondence value table are updated to the values detected by the control unit 10 most recently.

The type of sensor panel 3 may be either a self-capacitance type of panel or a mutual capacitance type of panel (of course, another scheme may be used). The control unit 10 detects a change in electrostatic capacitance at each detected point and detects an electrostatic capacitance correspondence value by a method corresponding to the type of sensor panel 3. As an example, the sensor panel 3 is a mutual electrostatic capacitance type of panel. In the sensor panel 3, an X-side sensor in which a transparent electrode is patterned to detect a change in electrostatic capacitance in the left-right direction, and a Y-side sensor in which a transparent electrode is patterned to detect a change in electrostatic capacitance in the up-down direction are provided to overlap. The control unit 10 acquires the magnitude of electrostatic capacitance of each electrode of the X-side sensor and the magnitude of electrostatic capacitance of each electrode of the Y-side sensor at a predetermined cycle, detects the magnitude of a change in electrostatic capacitance at each detected point based on the magnitude of electrostatic capacitance, and converts the magnitude of the change in electrostatic capacitance into an electrostatic capacitance correspondence value.

Next, a process of the operation detection device 8 when an operation on the knob member 6 is detected will be described. Based on a detection result of the sensor panel 3, the control unit 10 of the operation detection device 8 1) determines whether the number of peripheral proximity points A (to be described below) is two or more, which are points at which the detected object is brought in contact with or in proximity to the detection surface 4 in the peripheral region 11 of the periphery of the knob member 6, 2) determines that the operation by the user is valid when the number of peripheral proximity points A is two or more and the peripheral proximity points A transition to a specific mode, and 3) conversely determines that the operation by the user is not valid regardless of the transition of the peripheral proximity points A when the number of peripheral proximity points A is not two or more. Hereinafter, a process of the control unit 10 will be described in detail with reference to a flowchart.

Figure 5:
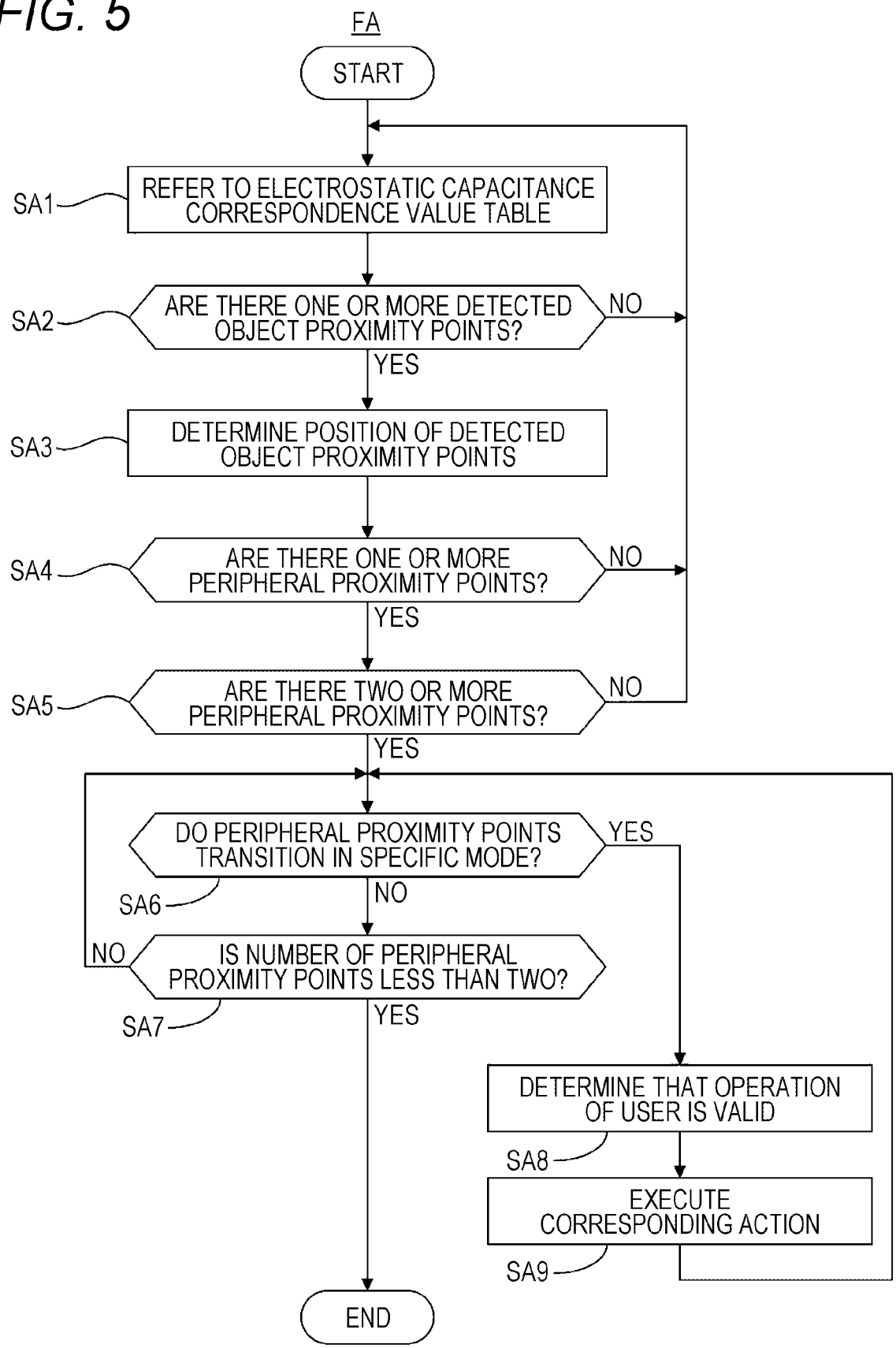
FIG. 5 is a flowchart illustrating an operation detection method by the operation detection device according to the embodiment of the present disclosure.

A flowchart FA of FIG. 5 is a flowchart illustrating an operation detection method by the operation detection device 8. The process of the flowchart FA of FIG. 5 is continuously executed by the operation detection device 8 while the operation on the knob member 6 is received. As illustrated in FIG. 5, the control unit 10 refers to an electrostatic capacitance corresponding value table stored in a predetermined storage area (step SA1). As described above, in the electrostatic capacitance correspondence value table, the coordinate information and the most recently detected electrostatic capacitance correspondence value are registered for each of the detected points formed on the detection surface 4.

Subsequently, the control unit 10 determines whether the number of detected object proximity points B is one or more for the entire region of the detection surface 4 based on the electrostatic capacitance correspondence value table (step SA2). Hereinafter, the process of step SA2 will be described in detail.

The detected object proximity points B are a group of detected points (a set of one or more detected points adjacent to each other) at which the electrostatic capacitance correspondence value is equal to or greater than the detection threshold T1. Hereinafter, a detected point at which the electrostatic capacitance correspondence value is equal to or more than the detection threshold T1 is referred to as a "reaction detected point C". The detection threshold T1 is set to a value such that, when the knob member 6 is pinched by fingers, a group of detected points of which an electrostatic capacitance correspondence value is equal to or greater than the detection threshold T1 appears behind each finger brought into contact with the outer periphery of the knob member 6. In particular, as illustrated in FIG. 3B, the fingers in contact with knob member 6 may be separated from surface 7 of the display input device 1 without being brought in contact with the surface 7. In consideration of this, the detection threshold T1 is set to such a value at which a group of detected points at which the electrostatic capacitance correspondence value is equal to or greater than the detection threshold T1 appears at positions corresponding to the fingers pinching the knob member 6, regardless of how the knob member 6 is pinched.

Since the detected object proximity points B are a group of detected points at which the electrostatic capacitance correspondence value is equal to or greater than the detection threshold T1, not only the detected object proximity points B appear to correspond to the fingers pinching the knob member 6, but also the detected object proximity points B appear at a position corresponding to the detected object when some detected object (not necessarily the fingers) comes into contact with or in proximity to the detection surface 4 at any position of the detection surface 4.

In step SA2, the control unit 10 recognizes the position of each detected point and the electrostatic capacitance correspondence value based on the electrostatic capacitance correspondence value table, and determines whether the number of detected object proximity points B on the detection surface 4 is one or more based on a relation between the position of each detected point and the electrostatic capacitance correspondence value. When it is determined that there is no detected object proximity points B (NO in step SA2), the control unit 10 returns the processing procedure to step SA1. Conversely, when there are one or more detected object proximity points B (YES in step SA2), the control unit 10 moves the processing procedure to step SA3.

In the embodiment, the control unit 10 is configured to determine in step SA2 whether there are the detected object proximity points B in the entire region of the detection surface 4, but may be configured to determine whether there are the detected object proximity points B not in the entire region of the detection surface 4, but in a region around the knob member 6 (a region that includes at least the peripheral region 11 to be described below and is broader than the peripheral region 11).

In the embodiment, the control unit 10 detects all "groups of reaction detected points C" as the detected object proximity points B. However, instead of setting all a "group of reaction detected points C" as the detected object proximity points B, the control unit 10 may be configured to detect only points that are highly likely to appear in contact with or in proximity to the fingers in the "group of reaction detected points C" as the detected object proximity points B. In the case of this configuration, for example, the control unit 10 does not detect the "group of reaction detected points C" at which the reaction detected points C are distributed to be elongated beyond an allowable range as the detected object proximity points B. This is because such a distribution of the reaction detected points C occurs due to noise. For example, the control unit 10 does not detect the "group of reaction detected points C" in which the reaction detected points C are distributed in a broad (or narrow) range beyond the allowable range as the detected object proximity points B. This is because such a distribution of the reaction detected points C occurs when the detected object other than the fingers comes into contact with or in proximity to the detection surface 4.

In step SA3, the control unit 10 determines the position of each of the detected object proximity points B. More specifically, the control unit 10 determines the position of the reaction detected point C having the highest electrostatic capacitance correspondence value among one or more reaction detected points C (detected points of which the electrostatic capacitance correspondence value is equal to or greater than the detection threshold T1) included in the detected object proximity points B as the position of the detected object proximity point B.

Figures 6, 7:
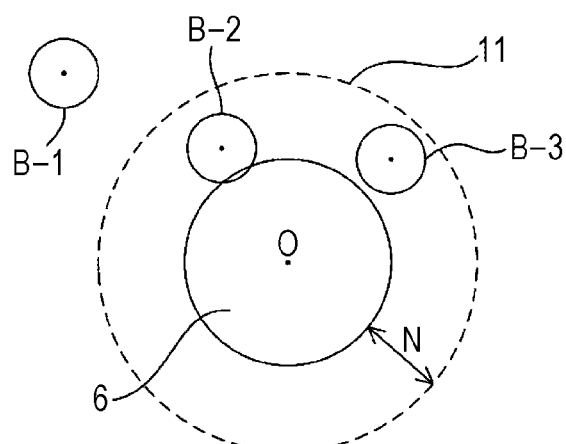
FIG. 6 is a diagram illustrating a detected electrostatic capacitance correspondence value written at each detected point of a detection surface.
FIG. 7 is a front view illustrating the periphery of the knob member.

FIG. 6 is a diagram in which the detection surface 4 is divided into a matrix form for each detected point, and an electrostatic capacitance correspondence value of each detected point is written in each cell. Now, it is assumed that the detection threshold T1 is "60 points". It is assumed that an electrostatic capacitance correspondence value is detected for each detected point as illustrated in FIG. 6 to correspond to one finger that pinches the knob member 6. In this case, a thinly painted region in FIG. 6 corresponds to the detected object proximity points B. In the example of FIG. 6, of the reaction detected points C belonging to the detected object proximity points B, the reaction detected point C having the electrostatic capacitance correspondence value of "87 points" is the reaction detected point C having the highest electrostatic capacitance correspondence value. Accordingly, the control unit 10 determines the position of the reaction detected point C at which the electrostatic capacitance correspondence value is "87 points" as the position of the detected object proximity point B.

The method of determining the position of the detected object proximity point B is not limited to the method exemplified in the embodiment. As an example, the control unit 10 may be configured to determine the position closest to the center of gravity of the detected object proximity point B as the position of the detected object proximity point B.

After the position of each of the detected object proximity points B is detected in step SA3, the control unit 10 determines whether the number of peripheral proximity points A is one or more (step SA4). Hereinafter, the process of step SA4 will be described in detail.

In the embodiment, the peripheral region 11 is defined in the periphery of the knob member 6. FIG. 7 is a front view illustrating the periphery of the knob member 6 to describe the peripheral region 11. As illustrated in FIG. 7, the peripheral region 11 is a circular region having a radius greater than the radius of the knob member 6 by N mm centering on the center point O of the knob member 6. The peripheral region 11 is defined from the viewpoint that when the user pinches the knob member 6, an electrostatic capacitance correspondence value equal to or greater than the detection threshold T1 is detected in the peripheral region 11 to correspond to each of the fingers pinching the knob member 6, and the size of the region is reduced as much as possible. A value of N (mm) is about 15 (mm) in consideration of a general finger width as an example.

Figure 8:
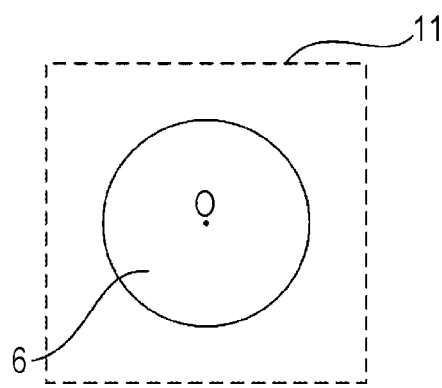
FIG. 8 is a diagram illustrating another example of a peripheral region.

The mode of the peripheral region 11 is not limited to the mode exemplified in the embodiment. That is, the peripheral region 11 may be any region as long as the electrostatic capacitance correspondence value equal to or greater than the detection threshold T1 is detected in the peripheral region 11 to correspond to each of the fingers pinching the knob member 6, and the size of the region is as small as possible. As an example, as illustrated in FIG. 8, the shape of the peripheral region 11 may be not a circle but a quadrangle centering on the center point O of the knob member 6. The shape of the peripheral region 11 is an appropriate shape in accordance with a situation around the knob member 6 (for example, presence of a switch or another object, the shape of the detection surface 4, or the like).

In step SA4, the control unit 10 first determines whether the position of each of the detected object proximity points B is in the peripheral region 11. Then, the control unit 10 determines the detected object proximity point B that is in the peripheral region 11 as a "peripheral proximity point A". In other words, of the detected object proximity points B, points that are in the peripheral region 11 are regarded as the "peripheral proximity point A", and points that are not in the peripheral region 11 are not regarded as the "peripheral proximity point A".

For example, referring to FIG. 7, it is assumed that the detected object proximity points B-1, B-2, and B-3 appear around the knob member 6 in the mode illustrated in FIG. 7. In FIG. 7, the detected object proximity points B-1, B-2, and B-3 are indicated by circles, and the positions thereof are indicated by black dots in the circles (the same also applies to FIGS. 13 and 16). In the example of FIG. 7, the detected object proximity point B-1 is not in the peripheral region 11, while the detected object proximity points B-2 and B-3 are in the peripheral region 11. In this case, the control unit 10 does not determine the detected object proximity point B-1 as the "peripheral proximity point A", but determines each of the detected object proximity points B-2 and B-3 as the "peripheral proximity point A". The peripheral proximity point A is a point at which the detected object is brought in contact with or in proximity to the detection surface 4 in the peripheral region 11 of the periphery of the knob member 6.

In step SA4, the control unit 10 determines whether each of the detected object proximity points B is the peripheral proximity point A from the viewpoint of whether the position is within the peripheral region 11, and then determines whether the number of peripheral proximity points A is one or more. When there is no peripheral proximity points A (NO in step SA4), the control unit 10 returns the processing procedure to step SA1. Conversely, when there are one or more peripheral proximity points A (YES in step SA4), the control unit 10 moves the processing procedure to step SA5.

Figure 9:
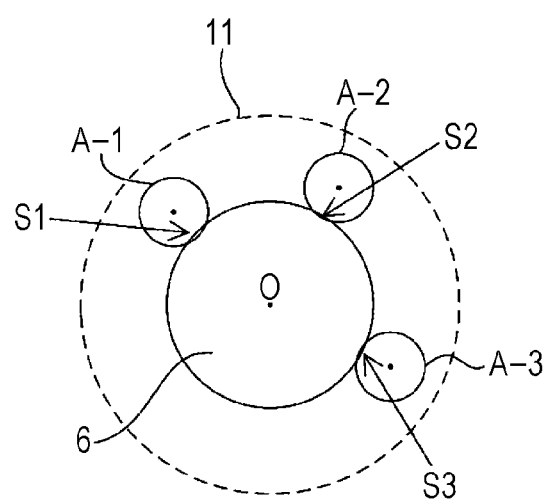
FIG. 9 is a front view illustrating the periphery of the knob member.

Here, the peripheral proximity point A appears at least in the following cases. That is, when the user is pinching the knob member 6, the corresponding peripheral proximity point A appears for each of the fingers pinching the knob member 6. FIG. 9 is a front view illustrating the periphery of the knob member 6 to describe the peripheral proximity point A. For example, referring to FIG. 9, it is assumed that the user holds knob member 6, and fingers (for example, as in the example of FIGS. 3A and 3B, the middle finger, the index finger, and the thumb) are respectively brought in contact with positions S1, S2, and S3 on the outer periphery of knob member 6. In this case, the peripheral proximity point A-1 appears to correspond to the position S1, the peripheral proximity point A-2 appears to correspond to the position S2, and the peripheral proximity point A-3 appears behind the position S3.

In step SA5, the control unit 10 determines whether the number of peripheral proximity points A is not two or more (step SA5). The significance of the process of step SA5 will be described in detail below. When the number of the peripheral proximity points A is two or more, it is highly likely that the knob member 6 is in the held state. But, when the number of the peripheral proximity points A is not two or more, it is highly likely that the knob member 6 is not in the held state.

When the number of the peripheral proximity points A is not two or more (NO in step SA5), the control unit 10 returns the processing procedure to step SA1. Conversely, when the number of peripheral proximity points A is two or more (YES in step SA5), the control unit 10 moves the processing procedure to step SA6.

When the number of the peripheral proximity points A is two or more (YES in step SA5), the control unit 10 monitors (determines) whether the number of the peripheral proximity points A is less than two while monitoring (determining) whether the peripheral proximity points A transitions to a specific mode (step SA7).

When the number of the peripheral proximity points A is less than two without the peripheral proximity points A transitions to a specific mode (YES in step SA7), the control unit 10 ends the processing of the flowchart FA. After the processing of the flowchart FA ends, the control unit 10 starts the processing of step SA1 again. One case in which the number of the peripheral proximity points A is less than two is a case in which the knob member 6 is separated from a state in where the knob member 6 is held.

Conversely, when the number of the peripheral proximity points A is not less than two and the peripheral proximity points A transition to the specific mode (YES in step SA6), the control unit 10 determines that the operation of the user is valid (step SA8) and executes a corresponding action (step SA9). Thereafter, the control unit 10 returns the processing procedure to step SA6. Hereinafter, the processes of steps SA6, SA8, and SA9 will be described in detail.

In step SA6, the control unit 10 monitors (determines) whether the peripheral proximity point A transitions to the specific mode. The specific mode is determined in advance. The control unit 10 continuously refers to the electrostatic capacitance table, monitors the transition of the peripheral proximity point A, and determines whether the peripheral proximity point A transitions to the specific mode.

Figure 10A:
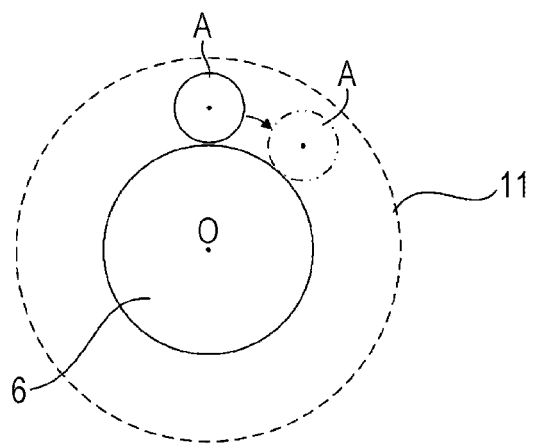
FIGS. 10A and 10B are diagrams illustrating examples of modes of transition of a peripheral proximity point A.

In the embodiment, "a mode TY1 that is a mode in which any one of the two or more peripheral proximity points A rotates 30 degrees Clockwise Y1 about the center point O of the knob member 6" is defined as one specific mode. FIG. 10A schematically illustrates a state in which one of the peripheral proximity points A transitions to the mode TY1. When the user pinches the knob member 6, for example, in the mode exemplified in FIGS. 3A and 3B, and then rotates the entire hand clockwise Y1 while sliding the fingers on the outer periphery of the knob member 6, the peripheral proximity point A transitions to the mode TY1.

Figure 10B:
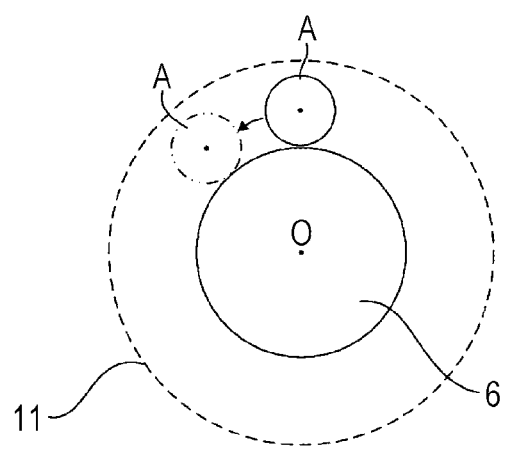

In the embodiment, "a mode TY2 that is a mode in which any one of the two or more peripheral proximity points A rotates 30 degrees Counterclockwise Y2 about the center point O of the knob member 6" is defined as one specific mode. FIG. 10B schematically illustrates a state in which one of the peripheral proximity points A transitions to the mode TY2. When the user pinches the knob member 6, for example, in the mode exemplified in FIGS. 3A and 3B, and then rotates the entire hand counterclockwise Y2 while sliding the fingers on the outer periphery of the knob member 6, the peripheral proximity point A transitions to the mode TY2.

In step SA8, the control unit 10 determines that the operation of the user is valid when the peripheral proximity point A transitions to the specific mode. That is, in the embodiment, when the peripheral proximity point A transitions to the specific mode, it is considered that the user intentionally executes a desired operation on the knob member 6, and it is determined that the operation of the user is valid by using this as a trigger.

In step SA9, the control unit 10 executes an action corresponding to the mode of transition of the peripheral proximity point A. In a simplified example of the embodiment, when the mode of transition of the peripheral proximity point A is the mode TY1, the control unit 10 increases the volume of the audio device by one unit. Conversely, when the mode of transition of peripheral proximity point A is the mode TY2, the control unit 10 reduces the volume of the audio device by one unit.

As described above, the control unit 10 of the operation detection device 8 according to the embodiment determines, based on a detection result of the sensor panel 3, whether the number of peripheral proximity points A which are points at which the detected object is brought in contact with or in proximity to the detection surface 4 in the peripheral region 11 of the peripheral of the knob member 6 is two or more. Then, the control unit 10 determines that the operation by the user is valid when the number of the peripheral proximity points A is two or more and the peripheral proximity points A transition to the specific mode. Conversely, when the number of the peripheral proximity points A is not two or more, the control unit 10 determines that the operation by the user is not valid regardless of the transition of the peripheral proximity points A.

In the above configuration, the following effects are obtained. That is, when the user executes an operation using the knob member 6, it is assumed that the knob member 6 is pinched, and thus two or more fingers are located on the periphery of the knob member 6. In other words, when the finger is not in such a state, even if it is detected that the fingers transition to a predetermined mode around the knob member 6, there is a high possibility of the operation by the user not being intentional. Based on this, according to the embodiment, when the number of points at which the detected object is brought in contact with or in proximity to the detection surface 4 on the periphery of the knob member 6 is not two or more, that is, when it is assumed that two or more fingers are not located on the periphery of the knob member 6 and the user is not pinching the knob member 6, the operation by the user is not valid. Therefore, it is possible to validly utilize the characteristic that two or more fingers are located on the periphery of the knob member 6 when the user executes the operation using the knob member 6, and to inhibit the operation from being determined to be valid against the intention of the user.

First Modification Example

Figure 11:
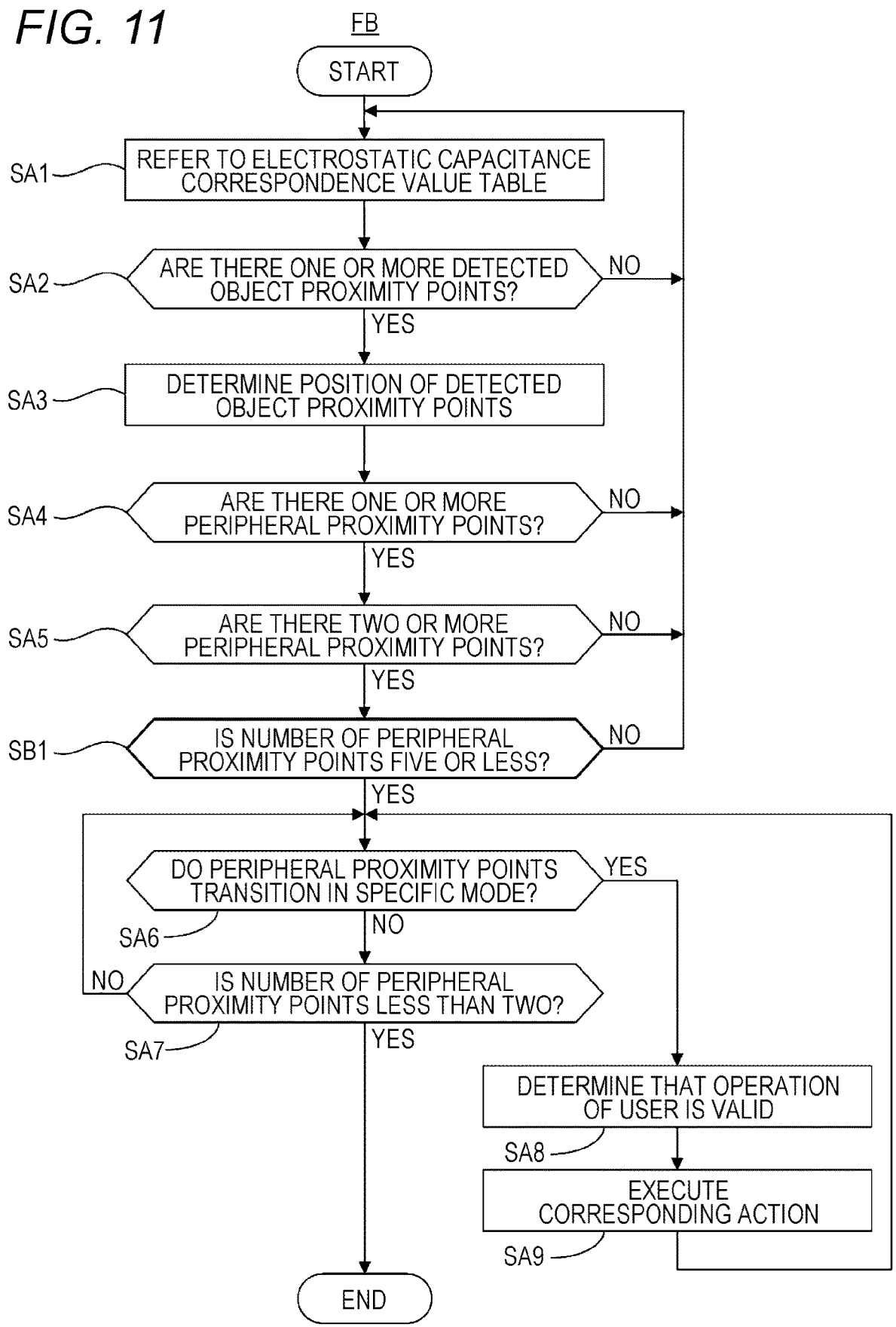
FIG. 11 is a flowchart illustrating an operation detection method by an operation detection device according to a first modification example of the present disclosure.

Next, a first modification example will be described. A flowchart FB of FIG. 11 is a flowchart illustrating an operation detection method by the operation detection device 8 according to the present modification example. In the flowchart FB of FIG. 11, the same steps as those of the flowchart FA of FIG. 5 are denoted by the same reference numerals. As is clear from the comparison between FIGS. 11 and 5, the control unit 10 of the operation detection device 8 according to the first modification example executes the process of step SB1 between the processes of steps SA5 and SA6. Details will be described below.

In step SA5, the control unit 10 determines whether the number of peripheral proximity points A is two or more. When the number of peripheral proximity points A is two or more (step SA5), the processing procedure moves to step SB1. In step SB1, the control unit 10 determines whether the number of peripheral proximity points A is five or less. When the number of the peripheral proximity points A is five or less (YES in step SB1), the control unit 10 moves the processing procedure to step SA6. On the other hand, when the number of the peripheral proximity points A is not 5 or less (NO in step SB1), the control unit 10 returns the processing procedure to step SA1.

As described above, the control unit 10 according to the present modification example determines whether the number of the peripheral proximity points A is two or more and five or less instead of determining whether the number of the peripheral proximity points A is two or more. Accordingly, the following effects are obtained.

That is, when the user pinches the knob member 6 with her or his fingers, the number of fingers brought into contact with the outer periphery of the knob member 6 is two or more and five or less. Therefore, when the user holds the knob member 6 with her or his fingers, the number of peripheral proximity points A is two or more and five or less. Therefore, when the number of the peripheral proximity points A is not five or less, it is assumed that the peripheral proximity point A does not appear because the user pinches the knob member 6, but the peripheral proximity point A appears for some other reason. Based on the above, according to the configuration of the present modification example, even when the number of peripheral proximity points A is two or more and the number of peripheral proximity points A is not five or less, the operation by the user is not valid. Therefore, it is possible to inhibit the operation from being determined to be valid against the intention of the user with higher accuracy.

Second Modification Example

Figure 12:
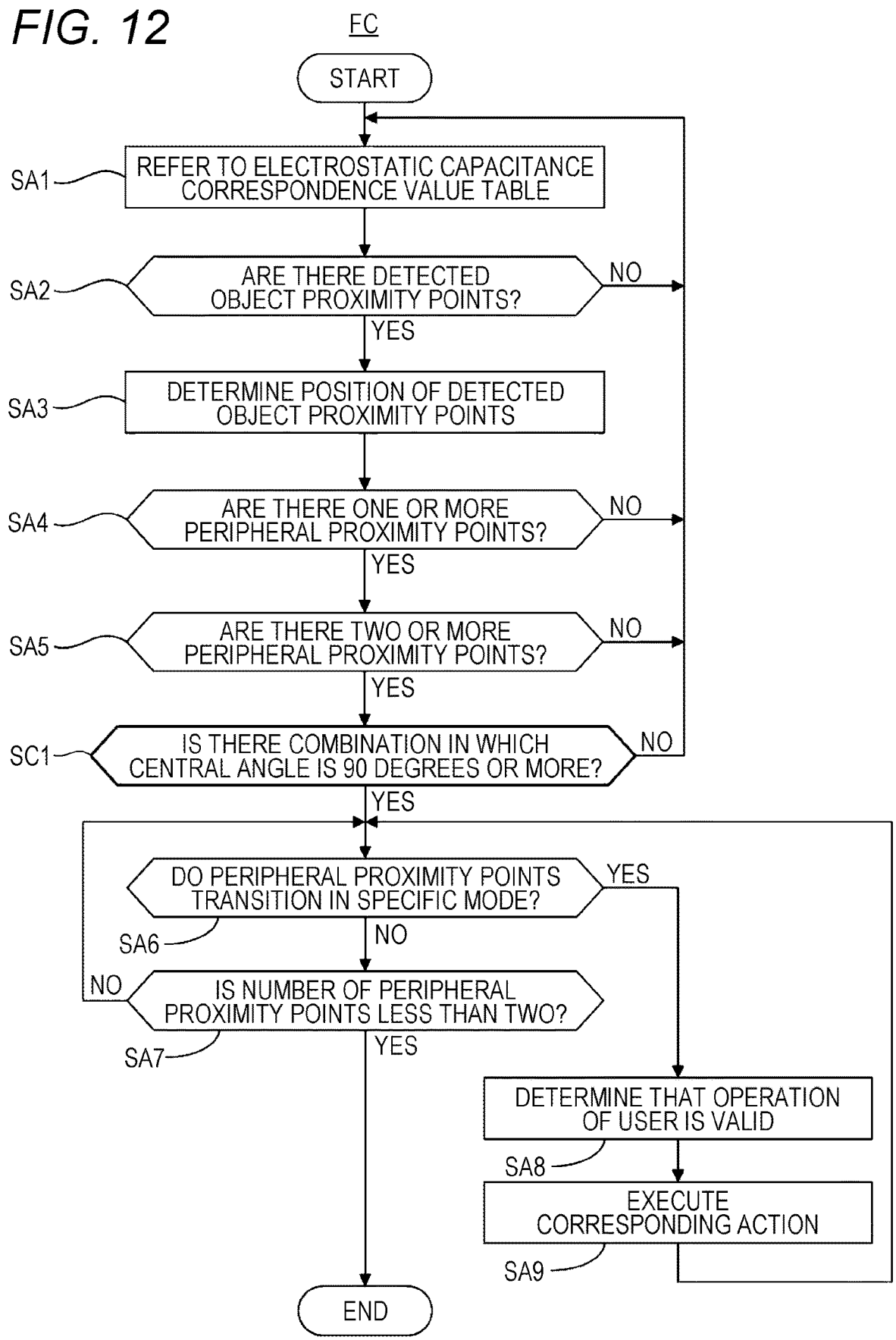
FIG. 12 is a flowchart illustrating an operation detection method by an operation detection device according to a second modification example of the present disclosure.

Next, a second modification example will be described. A flowchart FC of FIG. 12 is a flowchart illustrating an operation detection method by the operation detection device 8 according to the present modification example. In the flowchart FC of FIG. 12, the same steps as those of the flowchart FA of FIG. 5 are denoted by the same reference numerals. As is clear from the comparison between FIGS. 12 and. 5, the control unit 10 of the operation detection device 8 according to the second modification example executes the process of step SC1 between the processes of steps SA5 and SA6. Details will be described below.

In step SA5, the control unit 10 determines whether the number of peripheral proximity points A is two or more. When the number of peripheral proximity points A is two or more (step SA5), the processing procedure moves to step SC1. In step SC1, the control unit 10 determines, based on a detection result of the sensor panel 3, whether there is a combination of peripheral proximity points A in which the central angle around the central portion of the knob member 6 is 90 degrees or more. When there is the combination (YES in step SC1), the control unit 10 moves the processing procedure to step SA6. Conversely, when there is no combination (NO in step SC1), the control unit 10 returns the processing procedure to step SA1. Hereinafter, the processing of step SC1 will be described in detail.

In step SC1, the control unit 10 derives a central angle (hereinafter, simply referred to as a "central angle") centering on the center point O for every two combinations of the peripheral proximity points A. The angle of the central angle formed by one peripheral proximity point A and the other peripheral proximity points A at the center point O is a smallest angle among angles of the central angle formed by one peripheral proximity point A and the other peripheral proximity points A. Then, the control unit 10 determines whether the number combinations of peripheral proximity points A at a central angle of 90 degrees or more is one or more.

Figure 13A:
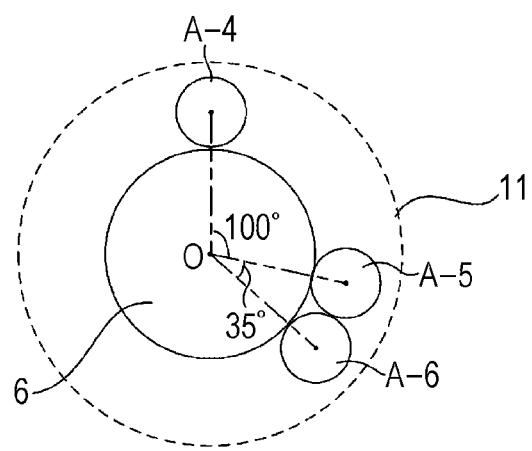
FIGS. 13A and 13B are front views illustrating the periphery of the knob member.

For example, as illustrated in FIG. 13A, it is assumed that peripheral proximity points A-4, A-5, and A-6 appear around the knob member 6. In this case, combinations of the peripheral proximity points A include {peripheral proximity points A-4 and A-5}, {peripheral proximity points A-5 and A-6}, and {peripheral proximity points A-4 and A-6}. As illustrated in FIG. 13A, a central angle corresponding to {peripheral proximity points A-4 and A-5} is 100 degrees, a central angle corresponding to {peripheral proximity points A-5 and A-6} is 35 degrees, and a central angle corresponding to {peripheral proximity points A-4 and A-6} is 135 degrees. In this case, there is a combination of the peripheral proximity points A having a central angle of 90 degrees or more. In this case, after the central angle is derived for each combination, the control unit 10 determines that "there is a combination of the peripheral proximity points A having a central angle of 90 degrees or more".

Figure 13B:
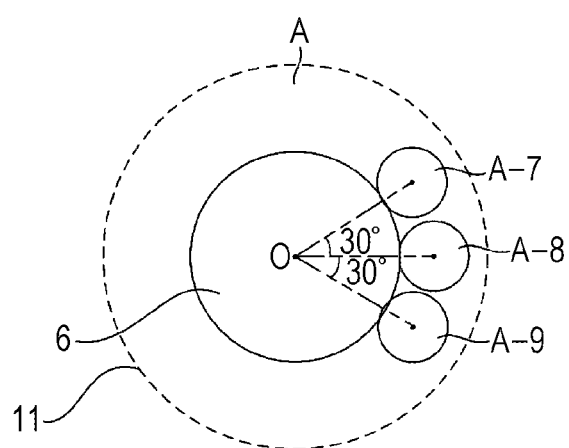

For example, as illustrated in FIG. 13B, it is assumed that the peripheral proximity points A-7, A-8, and A-9 appear around the knob member 6. In this case, combinations of the peripheral proximity points A include {peripheral proximity points A-7 and A-8}, {peripheral proximity points A-8 and A-9}, and {peripheral proximity points A-7 and A-9}. As illustrated in FIG. 13B, a central angle corresponding to {peripheral proximity points A-7 and A-8} is 30 degrees, a central angle corresponding to {peripheral proximity points A-8 and A-9} is 30 degrees, and a central angle corresponding to {peripheral proximity points A-7 and A-9} is 60 degrees. In this case, there is no combination of the peripheral proximity points A having a central angle of 90 degrees or more. In this case, the control unit 10 determines that "there is no combination of the peripheral proximity points A having the central angle of 90 degrees or more".

As described above, in the present modification example, when the number of peripheral proximity points A is two or more, the control unit 10 determines, based on a detection result of the sensor panel 3, whether there is the combination of peripheral proximity points A in which the central angle around the central portion of the knob member 6 is 90 degrees or more. Then, in a valid state in which the number of the peripheral proximity points A is two or more and there is the combination, the control unit 10 determines that the operation by the user is valid when the peripheral proximity point A transitions to the specific mode. Conversely, when the peripheral proximity points A are not in the valid state, the control unit determines that the operation by the user is not valid regardless of the transition of the peripheral proximity point A.

In the above configuration, the following effects are obtained. That is, when the user pinches the knob member 6, it is assumed that a combination of fingers having a central angle centering on the center point O of the knob member 6 of 90 degrees or more appears. The central angle here means a central angle formed by a position where one finger comes into contact with the knob member 6 and a position where another finger comes into contact with the knob member 6 with respect to the center point O. Theoretically, in such a state, force can be appropriately applied without straining to keep the fingers from disengaging away from the knob member 6. However, regardless of the theory, when a person pinches the knob member 6 unconsciously, such a state naturally is assumed.

Based on the above, according to the configuration of the present modification example, when there is no combination of the peripheral proximity points A in which the central angle is 90 degrees or more, that is, it is assumed that the knob member 6 is not held by the fingers, the operation by the user is not valid. Therefore, it is possible to inhibit the operation from being determined to be valid against the intention of the user with higher accuracy.

In the present modification example, in step SC1, the control unit 10 derives the central angle for all the combinations of the peripheral proximity points A to determine whether there is a combination of the peripheral proximity points A in which the central angle is 90 degrees or more. With regard to this, the control unit 10 may be configured to determine whether there is a combination of peripheral proximity points A in which the central angle is 90 degrees or more by executing another process. For example, instead of examining all the combinations, the control unit 10 may be configured to sequentially derive the central angle for each combination, stop the process of deriving the central angle when the central angle of 90 degrees or more is derived, and determine that "there is the combination of peripheral proximity points A having a central angle of 90 degrees or more". For example, the control unit 10 may be configured to extract a combination of the peripheral proximity points A having the largest central angle and determine whether there is a combination of peripheral proximity points A having a central angle of 90 degrees or more by determining whether the central angle exceeds 90 degrees for this combination.

The first modification example may, of course, be combined with the present modification example.

Third Modification Example

Figure 14:
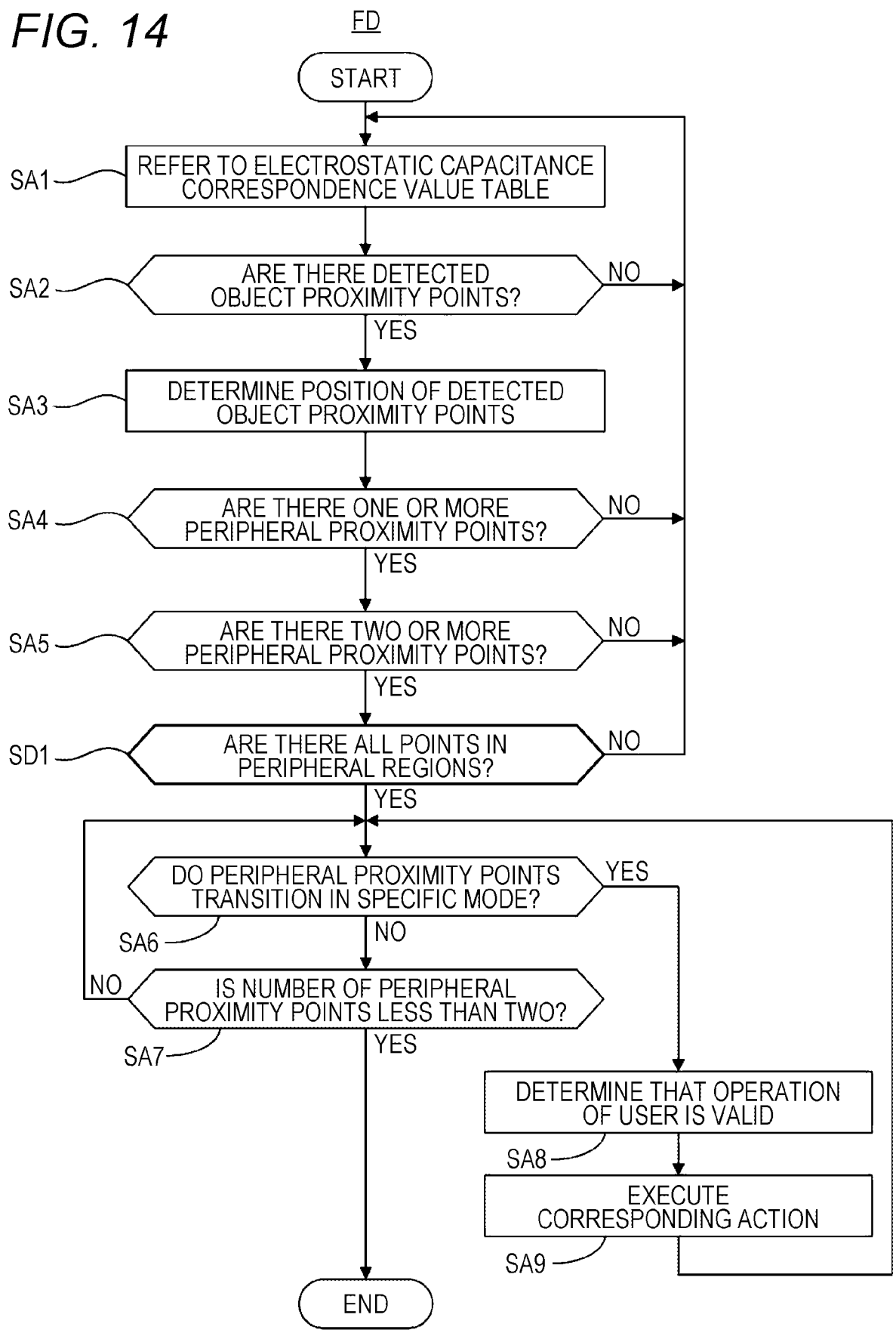
FIG. 14 is a flowchart illustrating an operation detection method by an operation detection device according to a third modification example of the present disclosure.

Next, a third modification example will be described. A flowchart FD of FIG. 14 is a flowchart illustrating an operation detection method by the operation detection device 8 according to the present modification example. In the flowchart FD of FIG. 14, the same steps as those of the flowchart FA of FIG. 5 are denoted by the same reference numerals. As is clear from the comparison between FIGS. 14 and 5, the control unit 10 of the operation detection device 8 according to the third modification example executes the process of step SD1 between the processes of steps SA5 and SA6. Details will be described below.

In step SA5, the control unit 10 determines whether the number of peripheral proximity points A is two or more. When the number of peripheral proximity points A is two or more (step SA5), the processing procedure moves to step SD1. In step SD1, based on a detection result of the sensor panel 3, the control unit 10 determines whether all the detected object proximity points B are in the peripheral region 11 in the detection target region 12 that is a region including the peripheral region 11 and is broader than the peripheral region 11. When all the detected object proximity points B in the detection target region 12 are in the peripheral region 11 (YES in step SD1), the control unit 10 moves the processing procedure to step SA6. Conversely, when the state in which "all of the detected object proximity points B in the detection target region 12 are in the peripheral region 11 of the knob member 6" is not established (No in step SD1), the control unit 10 returns the processing procedure to step SA1. Hereinafter, the process of step SD1 will be described in detail.

Figure 15:
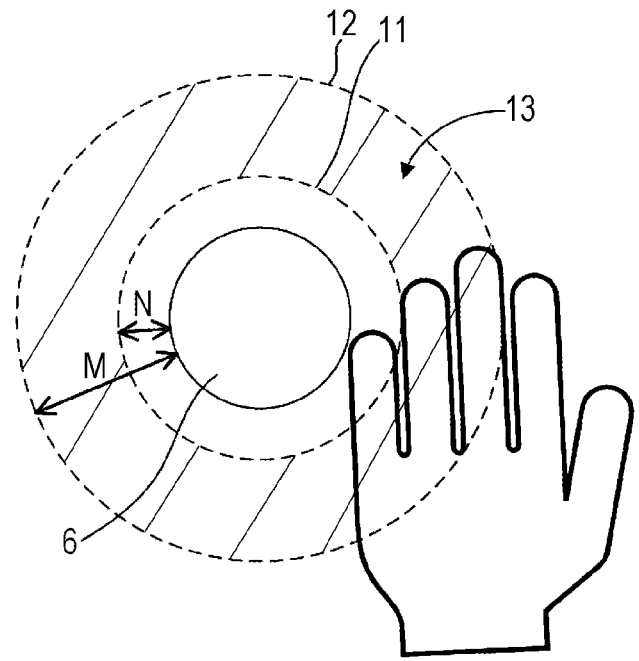
FIG. 15 is a front view illustrating the periphery of the knob member.

FIG. 15 is a front view illustrating the periphery of the knob member 6 to describe the detection target region 12. As illustrated in FIG. 15, the detection target region 12 is "a circular region having a radius greater than the radius of the knob member 6 by M (>N) mm centering on the center point O of the knob member 6".

As illustrated in FIG. 15, the detection target region 12 is defined as a region in which the fingers are also located in a region outside the peripheral region 11 and inside the detection target region 12 at the same time when user's fingers are accidentally located near or passes by the knob member 6 without an intention of the user to pinch the knob member 6, and the fingers are accordingly located in the peripheral region 11. As an example, when a general finger width is assumed to be "15 (mm)" and N (mm) related to the peripheral region 11 is about "15 (mm)" for one finger width, the value of M (mm) is about "45 (mm)" corresponding to three finger widths.

The mode of the detection target region 12 is not limited to the mode exemplified in the embodiment. As an example, the shape of the detection target region 12 may not be a circle but a quadrangle centering on the center point O of the knob member 6. The shape of the detection target region 12 is set to an appropriate shape according to the peripheral situation of the knob member 6 (for example, presence of a switch or another object, the shape of the detection surface 4, and the like) or the shape of the peripheral region 11.

Hereinafter, at the same time, a region outside of the peripheral region 11 and inside the detection target region 12 is referred to as a "region of interest 13". In FIG. 15, the region of interest 13 is indicated by hatching. As illustrated in FIG. 15, the region of interest 13 is a ring-shaped region surrounding the outer side of the peripheral region 11. In the example of FIG. 15, the little finger is located in the peripheral region 11, while the ring finger and the middle finger are located in the region of interest 13.

Figure 16:
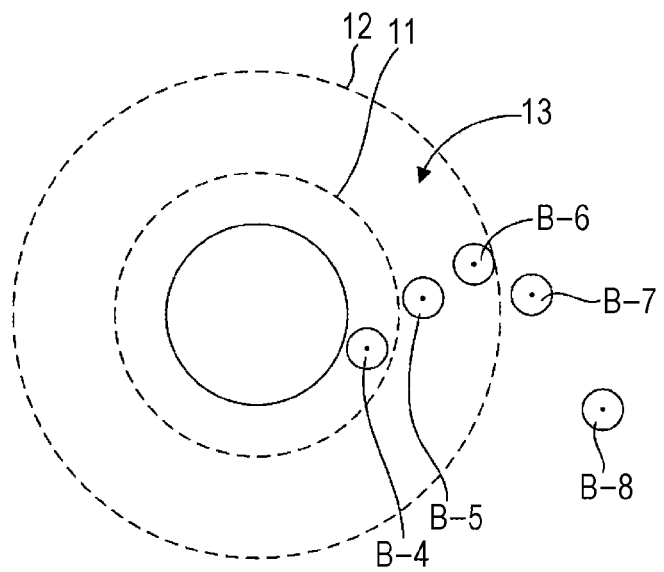
FIG. 16 is a front view illustrating the periphery of the knob member.

In step SD1, the control unit 10 determines whether one or more detected object proximity points B are in the region of interest 13. Here, when the detected object proximity points B are not in the region of interest 13, a "state in which all of the detected object proximity points B in the detection target region 12 are in the peripheral region 11" is established. Conversely, when one or more detected object proximity points B are located in the region of interest 13, a state that "all the detected object proximity points B in the detection target region 12 are located in the peripheral region 11" is not established. Based on this, the control unit 10 determines that "all the detected object proximity points B in the detection target region 12 are in the peripheral region 11 of the knob member 6" when the detected object proximity points B are not in the region of interest 13. Conversely, when one or more detected object proximity points B are located in the region of interest 13, the control unit 10 determines that a state in which the state in which "all of the detected object proximity points B in the detection target region 12 are in the peripheral region 11 of the knob member 6" is not established FIG. 16 is a diagram illustrating the detected object proximity points B detected around the knob member 6 when a user's hand is at the position illustrated in FIG. 15. In FIG. 16, a detected object proximity point B-4 corresponding to the little finger, a detected object proximity point B-5 corresponding to the ring finger, a detected object proximity point B-6 corresponding to the middle finger, a detected object proximity point B-7 corresponding to the index finger, and a detected object proximity point B-8 corresponding to the thumb are detected. When a situation of the detected object proximity point B is the situation illustrated in FIG. 16, in step SD1, the control unit 10 determines that one or more detected object proximity points B are in the region of interest 13, and thus determines that the state in which "all the detected object proximity points B in the detection target region 12 exist in the peripheral region 11 of the knob member 6" is not established.

Conversely, as described above, FIG. 9 is a diagram illustrating the detected object proximity points B (peripheral proximity points A) detected when the user grips the knob member 6. In FIG. 9, the peripheral proximity points A-1, A-2, and A-3 are all considered as the detected object proximity points B. It is assumed that three detected object proximity points B (peripheral proximity points A-1, A-2, and A-3) illustrated in FIG. 9 are detected, and other detected object proximity points B are not detected. In this case, the control unit 10 determines that the detected object proximity points B are not in the region of interest 13, and thus determines that "all the detected object proximity points B in the detection target region 12 are in the peripheral region 11 of the knob member 6".

As described above, in the present modification example, when the number of the peripheral proximity points A is two or more, the control unit 10 determines, based on the detection result of the sensor panel 3, whether all the points at which the detected object is in contact with or in proximity to the detection surface 4 are located in the peripheral region 11 in the detection target region 12 that is a region including the peripheral region 11 and is broader than the peripheral region 11. In the valid state in where the number of the peripheral proximity points A is two or more and all the points in the detection target region 12 are located in the peripheral region 11, the control unit 10 determines that the operation by the user is valid when the peripheral proximity points A transition to the specific mode. When the peripheral proximity points A are not in the valid state, the control unit 10 determines that the operation by the user is not valid regardless of transition of the peripheral proximity points A.

In the above configuration, the following effects are obtained. That is, when the user holds the knob member 6, only the fingers holding the knob member 6 (the fingers in contact with the outer periphery of the knob member 6) are brought in contact with or close to the detection surface 4. In this case, the detected object proximity points B appear only in the peripheral region 11. Conversely, when the user does not hold the knob member 6 and the fingers are accidentally positioned near the knob member 6, the fingers may come into contact with or approach the detection surface 4 not only at the periphery of the knob member 6 but also in a region away from the knob member 6. In such a situation, the detected object proximity points B appear not only in the peripheral region 11 but also in the region of interest 13.

Based on the above, according to the configuration of the present modification example, when the state in which "all the detected object proximity points B in the detection target region 12 are in the peripheral region 11 of the knob member 6" is not established, that is, when the state in which the knob member 6 is not held by the finger is assumed, the operation by the user is not valid. Therefore, it is possible to inhibit the operation from being determined to be valid against the intention of the user with higher accuracy.

The method of "a process of determining whether all the points at which the detected object is in contact with or in proximity to the detection surface 4 are located in the peripheral region 11 in the detection target region 12" exemplified in the present modification example is merely exemplary, and the control unit 10 may be configured to execute the process by another method. The first modification example may, of course, be combined with the present modification example.

Fourth Modification Example

Figure 17:
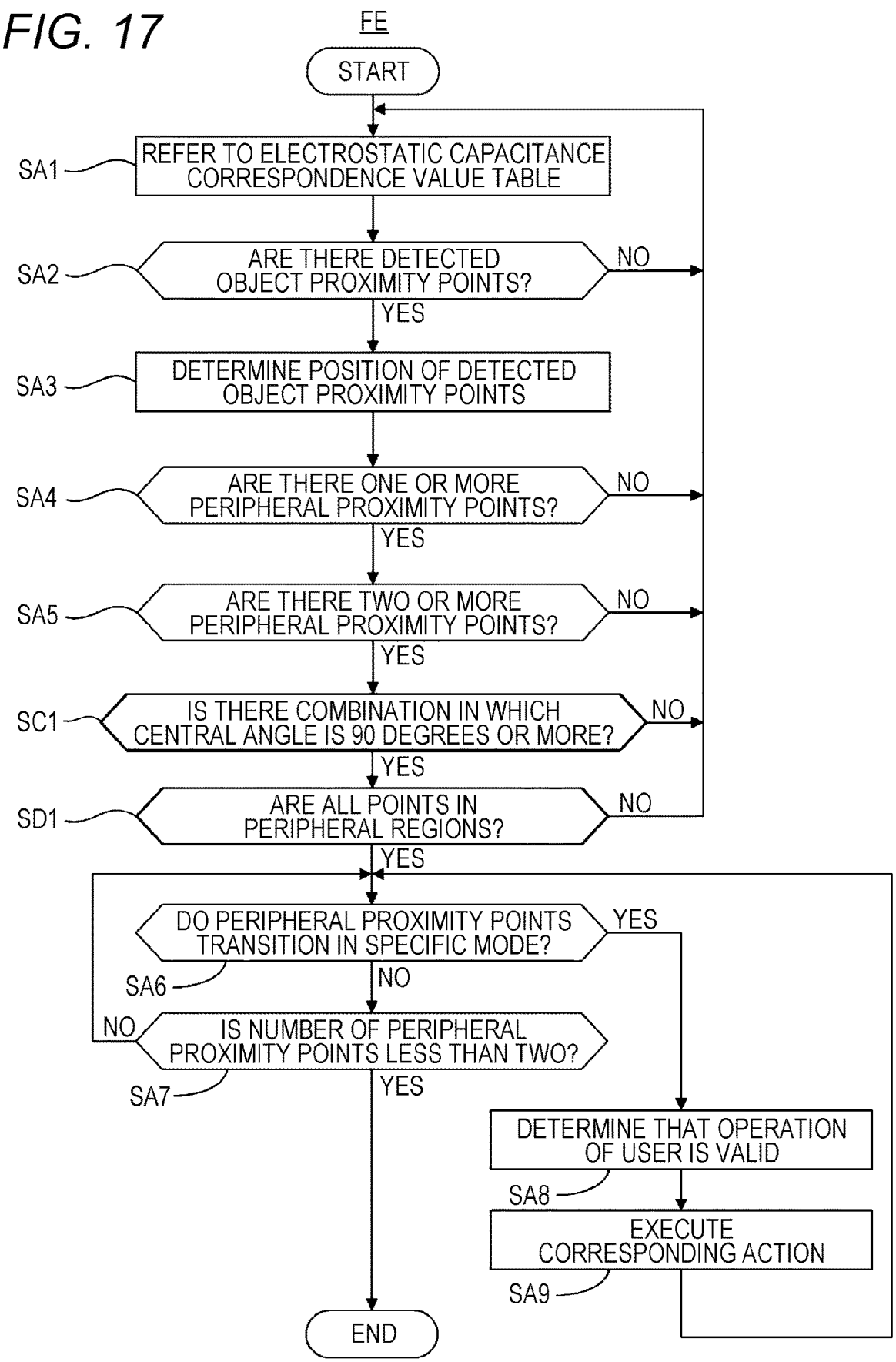
FIG. 17 is a flowchart illustrating an operation detection method by an operation detection device according to a fourth modification example of the present disclosure.
Figure 18:
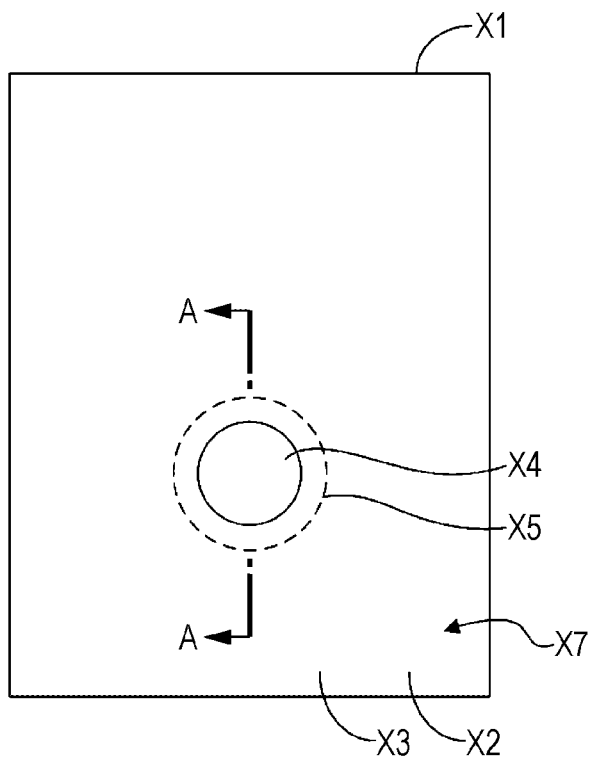
FIG. 18 is a front view illustrating an input device with a knob in the related art.
Figure 19:
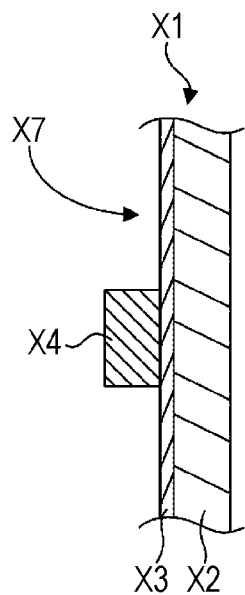
FIG. 19 is a cross-sectional view taken along the line A-A of FIG. 18.
Figure 20:
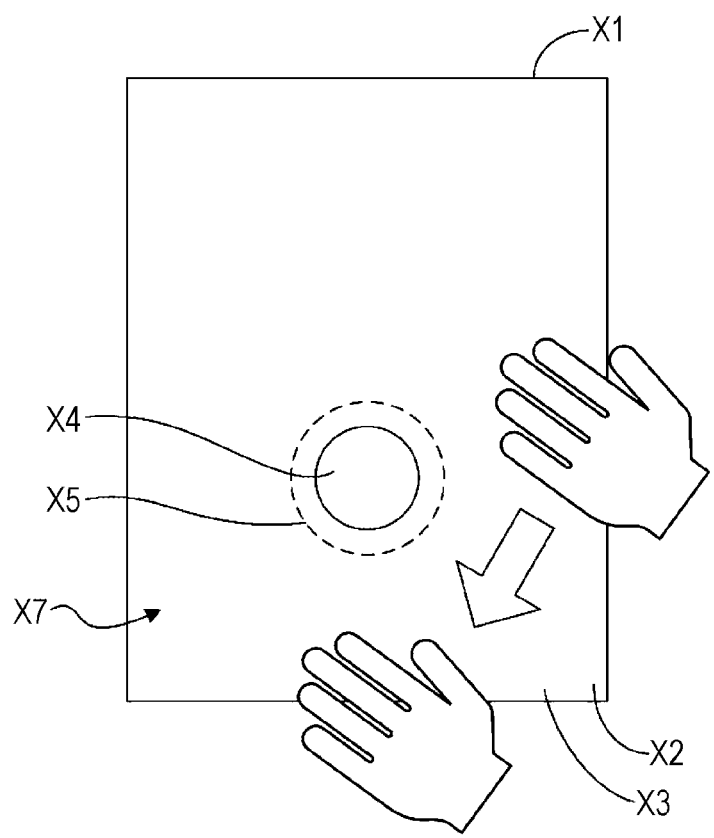
FIG. 20 is a front view illustrating an input device with a knob in the related art.

Next, a fourth modification example will be described. A flowchart FE of FIG. 17 is a flowchart illustrating an operation detection method by the operation detection device 8 according to the present modification example. In the flowchart FE of FIG. 17, the same steps as those of the flowchart FA of FIG. 5 are denoted by the same reference numerals. As is clear from the comparison between FIGS. 17 and 5, the control unit 10 of the operation detection device 8 according to the fourth modification example executes the process of step SC1 described in the second modification example and the process of step SD1 described in the third modification example between the processes of steps SA5 and SA6.

More specifically, in step SA5, it is determined whether the number of peripheral proximity points A is two or more. When the number of peripheral proximity points A is two or more (step SA5), the processing procedure moves to step SC1. In step SC1, the control unit 10 determines, based on a detection result of the sensor panel 3, whether there is a combination of peripheral proximity points A in which the central angle around the central portion of the knob member 6 is 90 degrees or more. When there is the combination (YES in step SC1), the control unit 10 moves the processing procedure to step SD1. Conversely, when there is no combination (NO in step SC1), the control unit 10 returns the processing procedure to step SA1. In step SD1, based on a detection result of the sensor panel 3, the control unit 10 determines whether all the detected object proximity points B are in the peripheral region 11 in the detection target region 12 that is a region including the peripheral region 11 and is broader than the peripheral region 11. When all the detected object proximity points B in the detection target region 12 are in the peripheral region 11 (YES in step SD1), the control unit 10 moves the processing procedure to step SA6. Conversely, when the state in which "all of the detected object proximity points B in the detection target region 12 are in the peripheral region 11 of the knob member 6" is not established (No in step SD1), the control unit 10 returns the processing procedure to step SA1. The order of the process of step SC1 and the process of step SD1 may be reversed.

As described above, in the present modification example, when the number of peripheral proximity points A is two or more, the control unit 10 determines, based on a detection result of the sensor panel 3, whether there is a combination of peripheral proximity points A in which the central angle centering on the central portion of the knob member 6 is 90 degrees or more, and whether all the points at which the detected object is in contact with or in proximity to the detection surface 4 are located in the peripheral region 11 in the detection target region 12 that is a region including the peripheral region 11 and is broader than the peripheral region 11. Then, in the valid state in which the number of peripheral proximity points A is two or more, there is the combination, and all the points are in the peripheral region 11, the control unit 10 determines that the operation by the user is valid when the peripheral proximity points A transition to the specific mode, and conversely determines that the operation by the user is not valid regardless of the transition of the peripheral proximity points A when the peripheral proximity points A are not in the valid state. According to this configuration, similarly to the second and third modification examples, it is possible to inhibit the operation from being determined to be valid against the intention of the user with higher accuracy.

The first modification example may, of course, be combined with the present modification example.

Although one embodiment (including modified examples) of the present disclosure has been described above, the above embodiment(s) is merely an example, and the technical scope of the present disclosure should not be interpreted in a limited manner. That is, the present disclosure can be implemented in various forms without departing from the gist or main features of the present disclosure.

For example, the operation detection device 8 and an external device may cooperatively execute some of the processes described as being executed by the functional block of the operation detection device 8. In this case, the operation detection device 8 and the external device cooperate with each other to function as an "operation detection device". As an example, the external device is a cloud server capable of communicating with the operation detection device 8 via a network.

For example, the embodiment can include provision of a program executed by a computer of the operation detection device 8, a recording medium in which the program is recorded in a computer readable manner, or a transmission medium for transmitting the program. As the recording medium, a magnetic or optical recording medium or a semiconductor memory device can be used. Specific examples of the recording medium include a portable or fixed recording medium such as a flexible disk, a hard disk drive (HDD), a compact disk read only memory (CD-ROM), a digital versatile disk (DVD), a Blu-ray (registered trademark) disc, a magneto-optical disc, a flash memory, and a card-type recording medium. The recording medium may be a recording medium included in the operation detection device 8 or an external device connected to the operation detection device 8.

For example, for the exemplified flowchart, the order of processes may be changed, the processes may be more finely divided, a process may be added, or the process may be deleted as long as the purpose can be realized and there is no contradiction in the process.

In each of the above-described embodiments, the operation detection device 8 has been described as a device independent of the sensor panel 3, but the operation detection device 8 does not need to be an independent device that can be distributed independently. As an example, a circuit or a unit mounted on the same housing as the touch panel 3 may be used.

What is claimed is:

1. An operation detection device for detecting an operation on a non-rotatable knob fixed to a detection surface of an electrostatic capacitive sensor panel, the non-rotatable knob assumed to be held by a hand of a user, the operation detection device comprising:
   a control unit configured to 1) determine, based on a detection result of the sensor panel, whether the number of peripheral proximity points that are points at which a detected object is in contact with or in proximity to the detection surface in a peripheral region of a periphery of the non-rotatable knob member is two or more, 2) determine that an operation by the user is valid when the number of peripheral proximity points is two or more and any one of the two or more peripheral proximity points rotates about the periphery of the non-rotatable knob a predetermined amount, and 3) conversely determine that the operation by the user is not valid regardless of the rotation of the peripheral proximity points when the number of peripheral proximity points is one, and/or 4) determine that the operation by the user is not valid when none of the peripheral proximity points rotate about the periphery of the non-rotatable knob the predetermined amount, wherein when the control unit determines that the operation by the user is valid, the control unit executes an action corresponding to the operation, and wherein when the control unit determines that the operation by the user is not valid, the control unit does not execute the action corresponding to the operation.

2. The operation detection device according to claim 1, wherein the control unit;

further determines whether there is a combination of the peripheral proximity points at which a central angle centering on a central portion of the non-rotatable knob member is 90 degrees or more, based on the detection result of the sensor panel, when the number of the peripheral proximity points is two or more, further determines that the operation by the user is valid when any one of the two or more peripheral proximity points rotates about the periphery of the non-rotatable knob the predetermined amount when the number of the peripheral proximity points is two or more and there is the combination, and further determines that the operation by the user is not valid when none of the peripheral proximity points rotate about the periphery of the non-rotatable knob the predetermined amount, and/or there is not the combination.

3. The operation detection device according to claim 1, wherein the control unit;

further determines whether all points at which the detected object is in contact with or in proximity to the detection surface are located in the peripheral region in a detection target region that is a region including the peripheral region and is broader than the peripheral region, based on the detection result of the sensor panel, when the number of the peripheral proximity points is two or more, further determines that the operation by the user is valid in which the number of the peripheral proximity points is two or more and all the points in the detection target region are in the peripheral region, when any one of the two or more peripheral proximity points rotates about the periphery of the non-rotatable knob the predetermined amount, and further determines that the operation by the user is not valid regardless of the rotation of the peripheral proximity points when any one peripheral proximity point is in the detection target region but outside the peripheral region.

4. The operation detection device according to claim 1, wherein the control unit;

further determines, based on the detection result of the sensor panel, whether there is a combination of the peripheral proximity points at which a central angle around a central portion of the non-rotatable knob member is 90 degrees or more and whether all points at which a detected object is in contact with or in proximity to the detection surface are located in the peripheral region in a detection target region that is a region including the peripheral region and is broader than the peripheral region, when the number of peripheral proximity points is two or more, further determines that the operation by the user is valid in which the number of the peripheral proximity points is two or more, there is the combination, and all the points in the detection target region are located in the peripheral region, when any one of the two or more peripheral proximity points rotates about the periphery of the non-rotatable knob the predetermined amount, and conversely determines that the operation by the user is not valid regardless of the rotation of the peripheral proximity points when there is not the combination, and/or any one peripheral proximity point is in the detection target region but outside the peripheral region.

5. The operation detection device according to claim 4, wherein:

the control unit determines whether the number of the peripheral proximity points is two or more and five or less instead of determining whether the number of the peripheral proximity points is two or more.

6. An operation detection unit comprising:

an input device including an electrostatic capacitive sensor panel and a non-rotatable knob member that is fixed to a detection surface of the sensor panel and is assumed to be held by a hand of a user; and an operation detection device including a control unit that 1) determines, based on a detection result of the sensor panel, whether the number of peripheral proximity points that are points at which a detected object is in contact with or in proximity to the detection surface in a peripheral region of a periphery of the non-rotatable knob member is two or more, 2) determines that an operation by the user is valid when the number of peripheral proximity points is two or more and any one of the two or more peripheral proximity points rotates about the periphery of the non-rotatable knob a predetermined amount, and 3) conversely determines that the operation by the user is not valid regardless of the rotation of the peripheral proximity points when the number of peripheral proximity points is one, and/or 4) determine that the operation by the user is not valid when none of the peripheral proximity points rotate about the periphery of the non-rotatable knob the predetermined amount, wherein when the control unit determines that the operation by the user is valid, the control unit executes an action corresponding to the operation, and wherein when the control unit determines that the operation by the user is not valid, the control unit does not execute the action corresponding to the operation.

7. An operation detection method for detecting an operation on a non-rotatable knob fixed to a detection surface of an electrostatic capacitive sensor panel, the non-rotatable knob assumed to be held by a hand of a user, the method comprising:

determining, based on a detection result of the sensor panel, whether the number of peripheral proximity points that are points at which a detected object is in contact with or in proximity to the detection surface in a peripheral region of a periphery of the non-rotatable knob is two or more;

determining that an operation by the user is valid when the number of peripheral proximity points is two or more and any one of the two or more peripheral proximity points rotates about the periphery of the non-rotatable knob a predetermined amount, determining that the operation by the user is not valid regardless of the rotation of the peripheral proximity points when the number of peripheral proximity points is one, and/or determining that the operation by the user is not valid when none of the peripheral proximity points rotate about the periphery of the non-rotatable knob the predetermined amount, executing an action corresponding to the operation wherein when it is determined that the operation by the user is valid, and not execute the action corresponding to the operation when it is determined that the operation by the user is not valid.

\* \* \* \* \*